(12) United States Patent
Porta et al.

(10) Patent No.: US 9,091,248 B2
(45) Date of Patent: Jul. 28, 2015

(54) WIND TURBINE

(75) Inventors: Peter Haakon Á Porta, Aalborg (DK); Yu Phu Du Tran, Tilst (DK); Hans Kristian Bjørn, Aarhus (DK); Steffen Henrik Madsen, Randers SØ (DK); Erik Markussen, Videbæk (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 660 days.

(21) Appl. No.: 13/503,793
(22) PCT Filed: Oct. 26, 2010
(86) PCT No.: PCT/EP2010/066139
§ 371 (c)(1), (2), (4) Date: May 22, 2012
(87) PCT Pub. No.: WO2011/051272
PCT Pub. Date: May 5, 2011

(65) Prior Publication Data
US 2012/0230836 A1 Sep. 13, 2012

Related U.S. Application Data
(60) Provisional application No. 61/255,292, filed on Oct. 27, 2009.

(30) Foreign Application Priority Data
Oct. 27, 2009 (DK) .................................. 2009 70174

(51) Int. Cl.
F03D 11/00 (2006.01)
F03D 11/04 (2006.01)
(52) U.S. Cl.
CPC ............... *F03D 11/00* (2013.01); *F03D 11/04* (2013.01); *F05B 2230/50* (2013.01); *F05B 2240/14* (2013.01); *Y02E 10/726* (2013.01); *Y02E 10/728* (2013.01); *Y10T 29/49778* (2015.01)
(58) Field of Classification Search
CPC ..... F03D 11/0075; F03D 11/00; F03D 11/04; F05B 2240/14; F05B 2230/50; Y10T 29/49778; Y02E 10/726; Y02E 10/728
USPC ........... 415/4.1, 4.3, 4.5, 905, 908; 416/9, 12, 416/14, 244 R, DIG. 4; 290/44, 55
See application file for complete search history.

(56) References Cited

U.S. PATENT DOCUMENTS 2,182,224 A * 12/1939 Dunn ............................... 439/27
8,113,480 B2 * 2/2012 Davis et al. .................... 248/637
(Continued)

FOREIGN PATENT DOCUMENTS

DE 10 2007 009 575 8/2008
EP 1 101 936 5/2001
(Continued)

OTHER PUBLICATIONS

Philipp Westermayer; International Search Report and Written Opinion issued in priority International Application No. PCT/EP2010/066139; Aug. 12, 2011; 12 pages; European Patent Office.
(Continued)

*Primary Examiner* — Dwayne J White
*Assistant Examiner* — Adam W Brown
(74) *Attorney, Agent, or Firm* — Wood, Herron & Evans, LLP (57) ABSTRACT

The present invention relates to a wind turbine comprising a nacelle, the nacelle having a substantially longitudinal extension, a height extension and a width extension, comprising a front end, a rear end, a bottom part, a top part and side parts, and being adapted to house a number of wind turbine components, which wind turbine components are supported by an internal support structure, the support structure comprising at least a main foundation which is positioned at the front end of the nacelle, and a rear frame which is connected to the main foundation at one end and extends from the main foundation towards the rear end of the nacelle. The main foundation comprises at least one foundation connection area, the foundation connection area being positioned where the rear frame is connected to the main foundation, the foundation connection area comprising at least a first face and a second face, the second face being displaced in a longitudinal direction, a height direction and/or a width direction of the nacelle in relation to a position of the first face on the main foundation, and the rear frame being connected to the main foundation via connections at least via the first face and the second face, respectively, of the foundation connection area.

13 Claims, 6 Drawing Sheets

(56) References Cited

U.S. PATENT DOCUMENTS

2009/0202350 A1* 8/2009 Pedersen .................. 416/146 R
2009/0261594 A1 10/2009 Christensen

FOREIGN PATENT DOCUMENTS

| EP | 1 291 521 | 3/2003 |
| EP | 1 336 755 | 8/2003 |
| WO | 2004/101313 | 11/2004 |
| WO | 2007/096008 | 8/2007 |
| WO | 2008/000267 | 1/2008 |

OTHER PUBLICATIONS

Philipp Westermayer; International Preliminary Report on Patentability issued in priority International Application No. PCT/EP2010/066139; Mar. 14, 2012; 14 pages; European Patent Office.
Sven Nytoft Rasmussen; 1st Technical Examination and Search Report issued in priority Denmark Application No. PA 200970174; Jun. 2, 2010; 5 pages; Denmark Patent and Trademark Office.
Nordex Energy GmbH; Technical Description, Nordex N90/2500 LS, Nordex N90/2500 HS, Version gamma; Sep. 22, 2009; 12 pages; Norderstedt, Germany.

\* cited by examiner

WIND TURBINE

TECHNICAL FIELD OF THE INVENTION

The present invention relates to a wind turbine comprising a nacelle, the nacelle having a substantially longitudinal extension, a height extension and a width extension, comprising a front end, a rear end, a bottom part, a top part and side parts, and being adapted to house a number of wind turbine components, which wind turbine components are supported by an internal support structure, the support structure comprising at least a main foundation which is positioned at the front end of the nacelle, and a rear frame which is connected to the main foundation at one end and extends from the main foundation towards the rear end of the nacelle.

BACKGROUND ART

The main foundation of a nacelle is adapted to at least transfer the loads and forces from the main axle of the wind turbine to the yaw bearing of the wind turbine. The rear frame is adapted to support different wind turbine components arranged inside the nacelle and is furthermore adapted to support other elements arranged inside the nacelle, for instance an overhung crane structure.

The rear frame is connected to the main foundation, enabling loads and forces from the different components and other elements being supported by the rear frame to be transferred to the main foundation via the connection to the yaw bearing of the wind turbine.

Accordingly, it is essential that the connection between the main foundation and the rear frame is solid to facilitate transfer of loads, forces and torques via this connection.

In some prior art solutions, the connection between the main foundation and the rear frame comprises bolt connections. However, in these prior solutions, the connection has proven to be less stable than desired, which causes unintended loads to the connection.

SUMMARY OF THE INVENTION

An object of the present invention is, at least partly, to overcome the above disadvantages and drawbacks of the prior art. More specifically, it is an object to provide a wind turbine with a connection between the main foundation and the rear frame where transfer of loads, torques and forces from the rear frame to the main foundation is facilitated.

It is also an object of the present invention to provide a connection between the main foundation and the rear frame, which is easy to handle during mounting.

The above objects, together with numerous other objects, advantages and features, which will become evident from the below description, are accomplished by a solution in accordance with the present invention by the main foundation comprising at least one foundation connection area, the foundation connection area being positioned where the rear frame is connected to the main foundation, and the foundation connection area comprising at least a first face and a second face, the second face being displaced in a longitudinal direction, a height direction and/or a width direction of the nacelle in relation to the position of the first face of the main foundation, and the rear frame being connected to the main foundation via connections at least via the first face and the second face, respectively, of the foundation connection area.

Even though a connection is used, the presence of the first and second faces, which are displaced in relation to each other, provides a solid connection for transferring loads, forces and torques from the rear frame to the main foundation. Furthermore, when the first and the second faces of the at least one connection area are displaced, mounting of the rear frame to the main foundation is facilitated since the two faces are separated from each other. In addition, a larger connecting area, which may be used for the connection, is obtained.

Furthermore, the second face may be displaced in a first direction towards the side parts of the nacelle and in a second direction towards the front end of the nacelle in relation to the position of the first face on the main foundation.

Also, the rear frame may comprise at least one frame connection area, the frame connection area being positioned where the rear frame is connected to the main foundation, the frame connection area comprising a first frame face and a second frame face, the second frame face being displaced in a first direction towards the side parts of the nacelle and in a second direction towards the front end of the nacelle, both in relation to a position of the first frame face on the rear frame.

In addition, the first frame face may be aligned with the first face of the main foundation, and the second frame face may be aligned with the second face of the main foundation.

Moreover, the main foundation may comprise a first side facing a side part of the nacelle and a second side facing an opposite side part of the nacelle.

Furthermore, both the first and the second side of the main foundation may comprise connection areas.

Also, the foundation connection area(s) of the main foundation may be positioned on internal surfaces of the main foundation.

Additionally, the foundation connection area may comprise one or more additional face(s), the one or more additional face(s) being displaced in a longitudinal direction, a height direction or a width direction of the nacelle and/or having a substantially perpendicular extension in relation to a position and extension of the first face on the main foundation.

Moreover, the connection may be a bolt connection, a rivet connection, a spot welding connection or a combination thereof.

Also, the rear frame may comprise at least two longitudinal frame elements extending from the main foundation and backwards towards the rear end. In this way, it is possible to obtain a rear frame with a large supporting area which may function as a floor element inside the nacelle.

In addition, the longitudinal frame elements may be connected along their extensions via at least one cross beam so that the rear frame may be strengthened in relation to torsion.

Moreover, two or more longitudinal frame elements may be arranged above each other and be connected to the main foundation.

Furthermore, the rear frame may comprise a first U- or C-profile arranged inside a second U- or C-profile.

In this way, the total strength and stiffness of the rear frame may be increased while the rear frame structure is still lightweight. Furthermore, the manufacturing process of the rear frame is facilitated since the frame may be produced using laser cutting and bending processes. This has the additional advantage that the accuracy of the rear frame is higher, which makes tolerances easier to control than in prior art solutions. Furthermore, the present invention makes it possible to design the rear frame in different longitudinal configurations, for instance a tapering from the main foundation towards the opposite end of the rear frame.

In addition, the first U- or C-profile and the second U- or C-profile may be connected via bolt connections or similar connections, which facilitates the handling and mounting of the rear frame.

Also, the first U- or C-profile may be extending beyond an end of the second U- or C-profile, the second U- or C-profile comprising the first frame face at its end, and the first U- or C-profile comprising the second frame face in the area extending beyond the second U- or C-profile.

Moreover, at least the first U- or C-profile may comprise a plurality of sub-U- or C-profiles which may be independent of each other and connectable to the second U- or C-profile via bolt connections or similar connections.

Because of this, the rear frame may be mounted to the main foundation in modules or parts, facilitating the assembly of the rear frame and the mounting of the rear frame to the main foundation.

Furthermore, the first U- or C-profile may comprise one or more holes, providing access to the second U- or C-profile.

Also, the main foundation and the rear frame may be connected via a plurality of bolt groups, the bolt groups being positioned in a way that enables control of a torque between the main foundation and the rear frame.

In addition, the connection between the main foundation and the rear frame may have a torque centre where the plurality of bolt groups are positioned at a distance from the torque centre to reduce the forces to be obtained by each bolt group.

Moreover, the connection between the first face and the first frame face may comprise a first and a second bolt group, the first and second bolt groups having extensions extending in a substantially horizontal direction, and the connection between the second face and the second frame face comprising a third and a fourth bolt group, the third and fourth bolt groups having extensions extending in a substantially vertical direction.

Furthermore, the main foundation may be casted or moulded and may be made of iron, steel, aluminium, reinforced fibres or a combination thereof.

Also, the rear frame may be made of steel, aluminium, reinforced fibres, composites or a combination thereof. By means of the present invention, it is possible to use a large variety of different materials to manufacture the rear frame.

In addition, the support structure may be supporting an overhung crane structure.

The invention also relates to a method for connecting a rear frame to a main foundation in a nacelle for a wind turbine, the method comprising the steps of:
- aligning the first frame face of a rear frame with the first face of a main foundation,
- connecting the first frame face with the first face by means of bolts,
- aligning the second frame face of the rear frame with the second face of the main foundation, and
- connecting the second frame face with the second face by means of bolts.

BRIEF DESCRIPTION OF THE DRAWINGS

The invention and its many advantages will be described in more detail below with reference to the accompanying schematic drawings which, for the purpose of illustration, show some non-limiting embodiments, and in which.

All the drawings are schematic and not necessarily to scale, and they show only those parts which are necessary in order to elucidate the invention, other parts being omitted or merely suggested.

DESCRIPTION OF PREFERRED EMBODIMENTS

Figure 1:
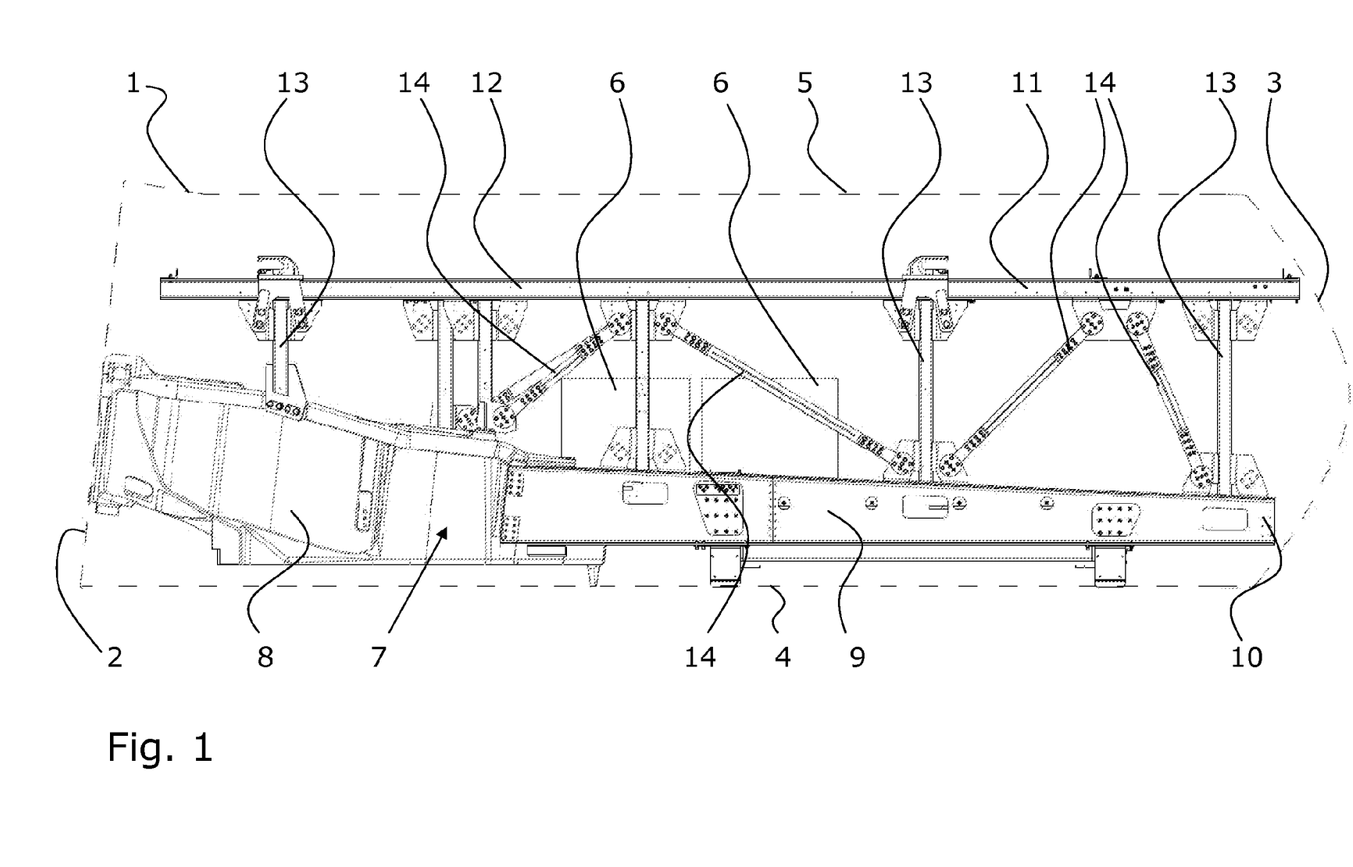
FIG. 1 shows a side view of the internal support structure of a nacelle.

In FIG. 1, a nacelle 1 of a wind turbine is shown depicted in a dotted line. The nacelle 1 has a substantially longitudinal extension, a height extension and a width extension. The nacelle may have a variety of different configurations, such as rectangular, tubular or other designs, however, configurations most commonly have a longitudinal extension, a height extension and a width extension.

The nacelle 1 comprises a front end 2, a rear end 3, a bottom part 4, a top part 5 and side parts (not shown) and is adapted to house a number of wind turbine components 6 which are supported by an internal support structure 7.

The support structure 7 comprises a main foundation 8 which is positioned at the front end 2 of the nacelle 1 and a rear frame 9 which is connected to the main foundation 8 at one end and extends from the main foundation 8 towards the rear end 3 of the nacelle 1.

The rear frame 9 tapers from the main foundation 8 towards the end 10 positioned at the rear end 3 of the nacelle 1. The rear frame 9 may in other embodiments have other configurations, such as a straight beam/profile, or it may taper from the rear end towards the main foundation.

In FIG. 1, the support structure 7 supports an overhung crane structure 11. The crane structure 11 consists of overhung longitudinal crane beams 12 which are supported by vertical beams 13. The vertical beams 13 are supported by the main foundation 8 and the rear frame 9. Furthermore, several struts 14 are arranged for supporting the overhung longitudinal crane beams 12 in a longitudinal direction.

Figure 2:
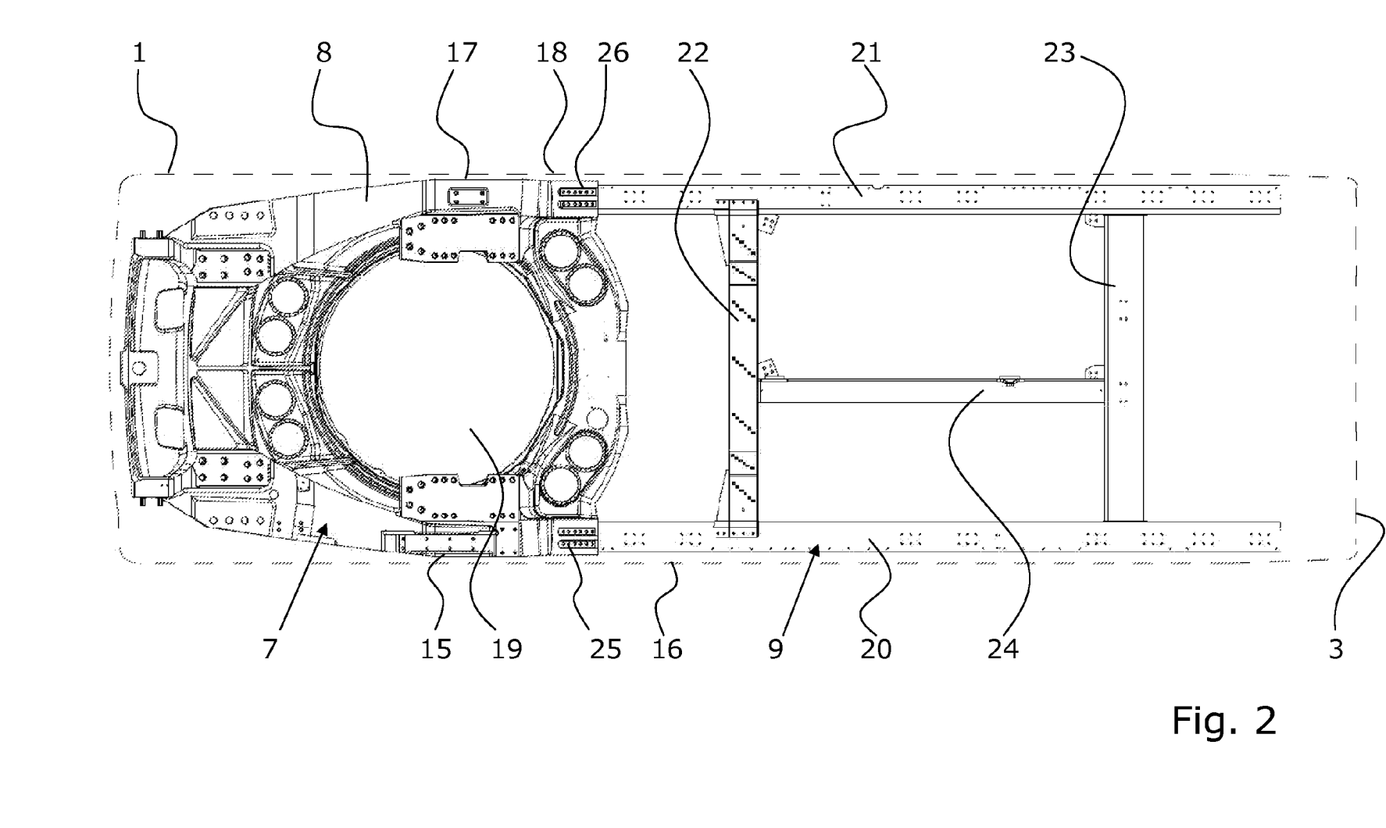
FIG. 2 shows a top view of the internal support structure of a nacelle.

In FIG. 2, the internal support structure 7 is shown in a top view. The main foundation 8 comprises a first side 15 facing a side part 16 of the nacelle 1 and a second side 17 facing an opposite side part 18 of the nacelle 1.

Furthermore, the main foundation 8 is connected to a yaw bearing (not shown) of the wind turbine via an opening 19. The main foundation 8 is adapted to at least transfer the loads and forces from the main axle (not shown) of the wind turbine to the yaw bearing. The yaw bearing is connected to the top of the tower of the wind turbine.

The rear frame 9 comprises two longitudinal frame elements 20, 21 extending from each side 15, 17 of the main foundation 8 and backwards towards the rear end 3 of the nacelle 1, meaning that the main part of the nacelle 1 is covered by the internal support structure 7. The longitudinal frame elements 20, 21 are connected along their extensions via two cross beams 22, 23. A further longitudinal support beam 24 is arranged between the two cross beams 22, 23.

In another not shown embodiment, two or more longitudinal frame elements, which are connected to the main foundation, may be arranged above each other.

The longitudinal frame elements 20, 21 are connected to both the first 15 and the second 17 side of the main foundation 8 at the connection areas 25, 26.

Figure 3:
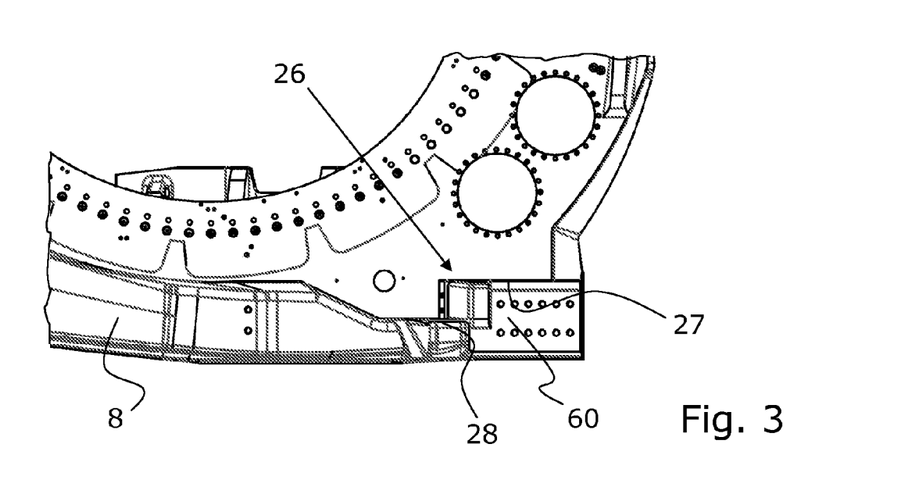
FIG. 3 shows a top view of a part of the main foundation having a first and a second face.

In FIG. 3, a part of the main foundation 8 is shown in a bottom view. The main foundation 8 comprises at least one foundation connection area 26, the foundation connection area 26 being positioned where the rear frame (not shown) is connected to the main foundation 8. The foundation connection area 26 comprises a first face 27 and a second face 28.

The second face 28 is in this embodiment displaced in a longitudinal direction and a width direction of the nacelle in relation to a position of the first face 27 on the main foundation 8. In another embodiment, the second face may also be displaced in a vertical direction of the nacelle.

Furthermore, an additional third face 60 is arranged in connection with the foundation connection area 26, said third face 60 having an orientation extending perpendicularly from the first face 27. The third face 60 may also be used to fasten the rear frame to the main foundation.

In another not shown embodiment, the faces of the foundation connection area may form a jig for the rear frame, thereby providing a greater contact surface between the rear frame and the main foundation, which may result in a more solid connection.

The faces of the foundation connection area may also be arranged so that they form a substantially square-shaped hole in the main foundation. In said square-shaped hole, the rear frame may be inserted during the assembly and mounting process and the rear frame may subsequently be fastened to the main foundation. In this way, it is obtained that the rear frame may be restrained in the main foundation, thereby providing a solid connection between the main foundation and the rear frame, which may absorb the loads, forces and torques from the rear frame.

Figure 4:
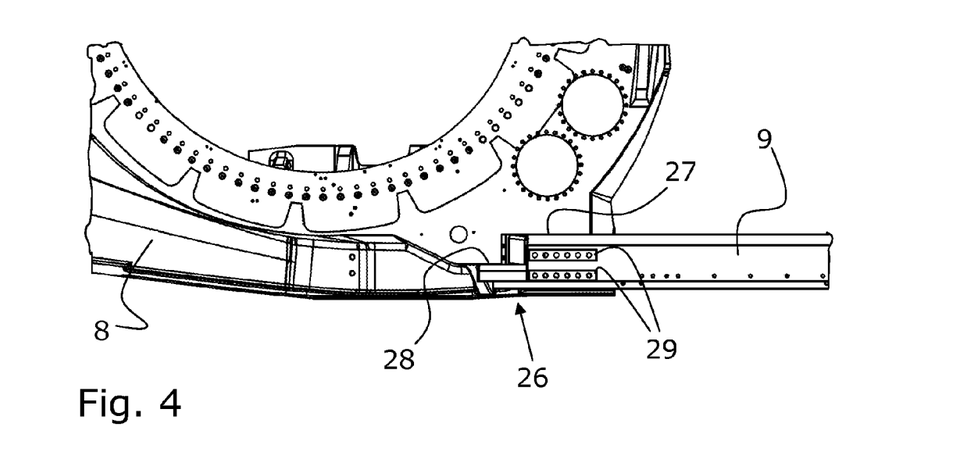
FIG. 4 shows a bottom view of a part of the rear frame, said rear frame comprising two profiles.

In FIG. 4, a part of the main foundation 8 and a part of the rear frame 9 are shown in a bottom view. The connection area 26 has the first face 27 and the second face 28, and the second face 28 is displaced in a first direction outwards towards the side parts (not shown) of the nacelle and in a second direction towards the front end of the nacelle in relation to the position of the first face 27 on the main foundation 8.

Furthermore, in FIG. 4, the rear frame 9 is composed by two connected profiles, said profiles being connected, inter alia via bolt groups 29. The rear frame is designed so that it comprises a first frame face which in its mounted state is aligned with, and thereby positioned in, the same plane as the first face of the main foundation 8, and a second frame face, which in its mounted state is aligned with, and thereby positioned in, the same plane as the second face of the main foundation 8. Thus, the second frame face is also displaced in the first direction outwards towards the side parts (not shown) of the nacelle and in the second direction towards the front end of the nacelle in relation to the position of the first frame face on the rear frame 9. In this embodiment, the second frame face is placed on a first profile while the first frame face is placed on a second profile, and the first profile has a longer extension towards the front end of the nacelle than the second profile.

Figure 5:
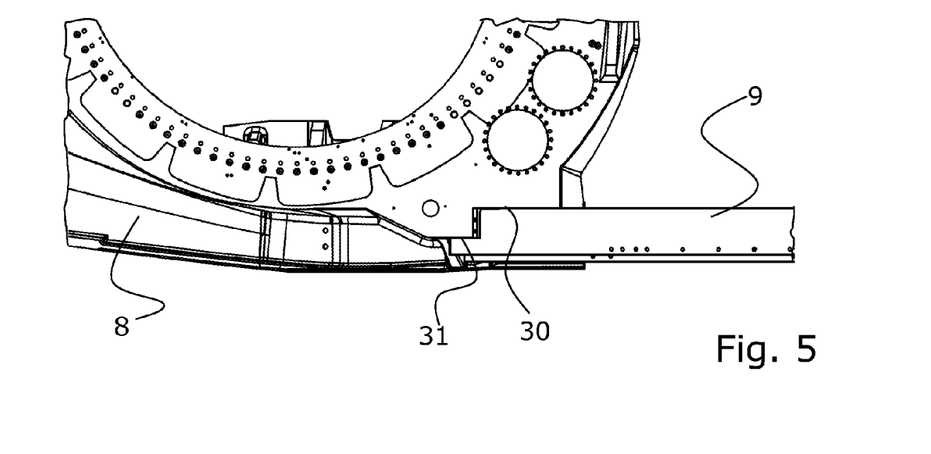
FIG. 5 shows a bottom view of a part of another embodiment of the rear frame, said rear frame being one element.

In FIG. 5, a part of the main foundation 8 and a part of another rear frame 9 are shown in a bottom view. In FIG. 5, the rear frame 9 is made in one piece, but still comprises a first frame face 30 and a second frame face 31, said first and second frame faces 30, 31 being positioned so that they are adapted to be geometrically aligned with the first and second faces of the main foundation 8.

Figure 6:
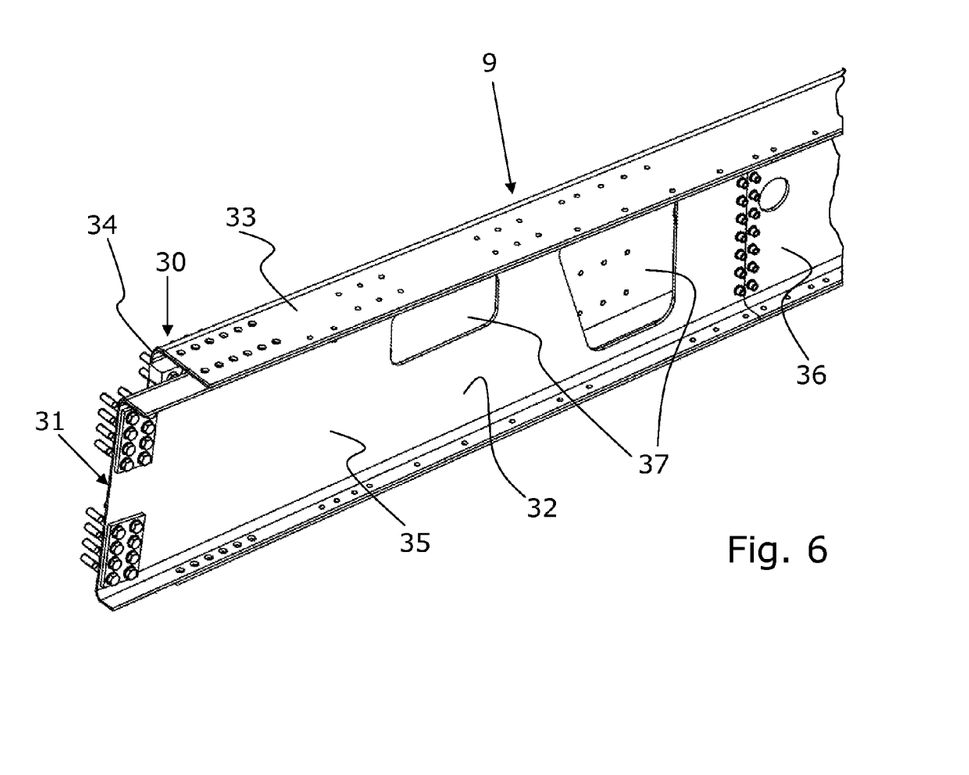
FIG. 6 shows an embodiment of the rear frame.

In FIG. 6, a part of the rear frame 9 is shown. The rear frame 9 is in this embodiment comprised by a first C-profile 32 arranged inside a second C-profile 33. The first C-profile 32 and the second C-profile 33 are connected via bolt connections or similar connections.

Furthermore, the first C-profile 32 extends beyond an end 34 of the second C-profile 33, the second C-profile 33 comprising the first frame face 30 at the end 34 and the first C-profile 32 comprising the second frame face 31 in the area extending beyond the second C-profile 33.

Moreover, the first C-profile 32 comprises a plurality of sub-C-profiles 35, 36, said sub-C-profiles 35, 36 being independent of each other and connectable to the second C-profile 33 via bolt connections or similar connections. This is an advantage in a mounting process where the second C-profile 33 and the first C-profile 32 are connected to each other except the sub-C-profile 35. The second C-profile may then be bolted to the main foundation using appropriate tools, and the sub-C-profile 35 may subsequently be bolted to the second C-profile 33 and to the main foundation at the second frame face 31.

Additionally, the first C-profile 32 comprises one or more holes 37 providing access to the second C-profile 33, which also facilitates mounting and assembly of the rear frame.

Figure 7:
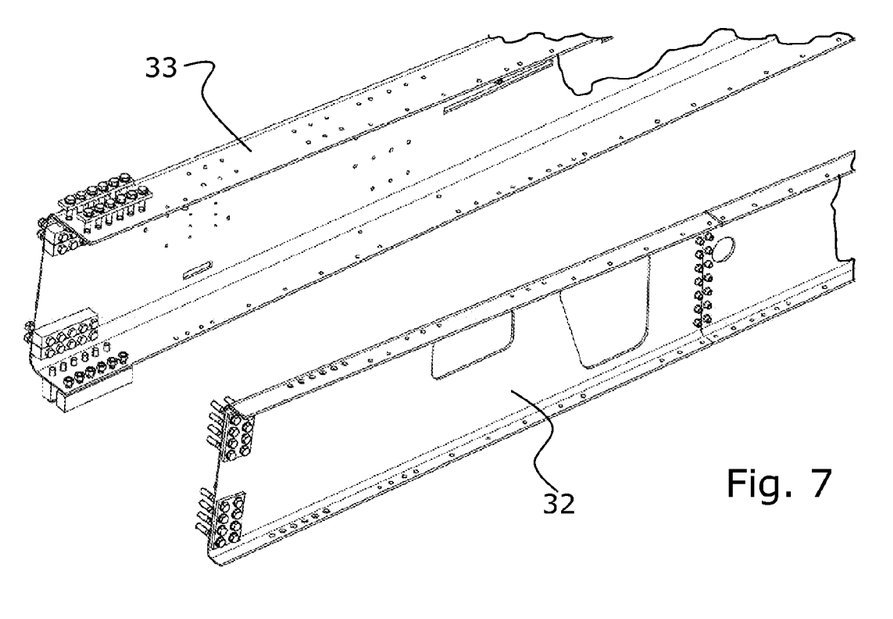
FIG. 7 shows the rear frame of FIG. 6 in a partly separated state.

In FIG. 7, the first C-profile 32 is separated from the second C-profile 33, and the different bolt groups for connecting the C-profiles 32, 33 and the rear frame to the main foundation, respectively, are easily deduced.

Figure 8:
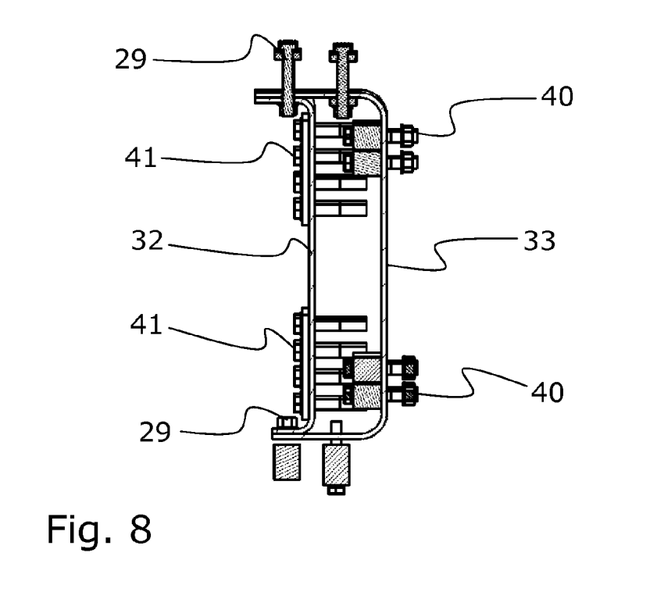
FIG. 8 shows a cross-sectional view of the rear frame of FIG. 6.

In FIG. 8, the rear frame 9 is shown in a cross sectional view seen from the rear end of the nacelle. The first C-profile 32 is inserted into the second C-profile 33, and their flanges are connected via bolts 29. Furthermore, two first bolt groups 40 extend through the second C-profile 33 to be connected with the first face of the main foundation. Two second bolt groups 41 extend through the first C-profile 32 to be connected with the second face of the main foundation.

Splitting the cross-section of the rear frame into to sub-profiles makes it possible to create a large distance between the bolt groups and the connection to the main foundation, which provides a more solid and stable connection.

Moreover, by composing the rear frame of profiles, it is possible to control and enhance the total strength and stiffness of the rear frame.

Furthermore, by providing the rear frame of C-profiles, the manufacturing process of the rear frame may be based on the accuracy from the laser cutting and bending process, which means that tolerances are easier to control than in traditional welded rear frames.

Also, the rear frame may be made of steel, aluminium, reinforced fibres, composites or a combination thereof. Additionally, the different parts of the rear frame and the connection area of the main foundation may comprise friction enhancing means, for instance spray metalise.

According to the invention, the rear frame is fastened to the main foundation via a connection. This connection may be a bolt connection, a rivet connection, a spot welding connection or a combination thereof. Furthermore, the connection may also comprise adhesives, such as glue.

Figure 9:
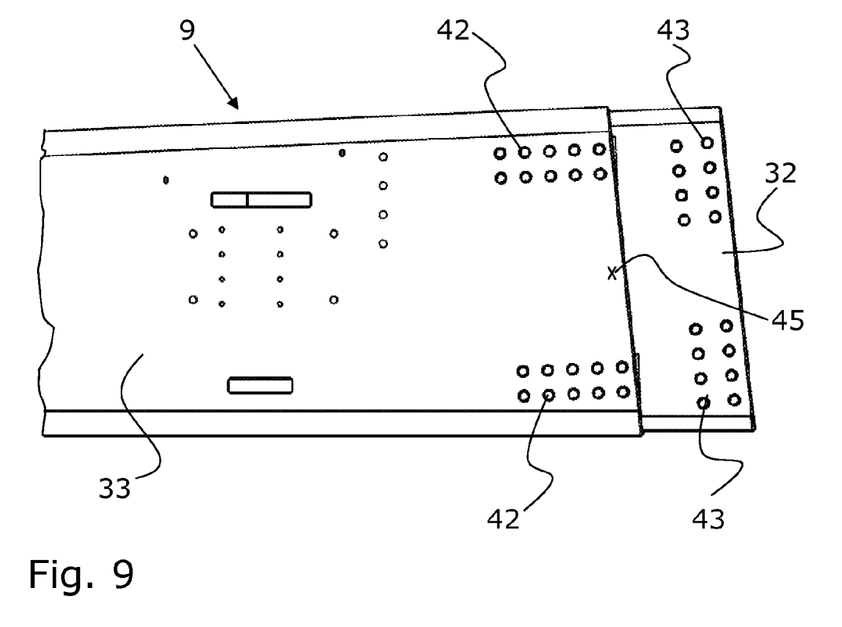
FIG. 9 shows openings for the bolt connections between the main frame and the rear frame.

In FIG. 9, the rear frame 9 is shown from the main foundation (not shown). On the second C-profile 33, two hole patters 42 are arranged at the top, at the bottom, and at the end. The two hole patterns 42 each comprise two horizontal rows of holes, each row having five holes. On the first C-profile 32, two hole patterns 43 are arranged at the top, at the bottom and at the end of the first C-profile 32, the end of the first C-profile 32 being displaced in relation to the end of the second C-profile 33. The two hole patterns 43 each comprise two vertical rows of holes, each row having five holes.

The hole patterns 42, 43 are adapted to the bolt groups connecting the main foundation and the rear frame.

In addition, the connection between the main foundation and the rear frame may have a torque centre 45 where the plurality of bolt groups are positioned at a distance from the torque centre 45 to reduce the forces to be obtained by each bolt group.

Due to the design and position of the four bolt groups shown as holes in FIG. 9, it is obtained that each bolt group absorbs moments resulting in $\Sigma T=0$.

Furthermore, the bolts used for the connection may be welded on the main foundation, and nuts may be screwed onto them. The main foundation may also comprise threaded holes into which bolts are screwed. The main foundation may also comprise throughgoing holes into which the bolts are inserted, and nuts are placed on the opposite side of the bolts.

Although the invention has been described in the above in connection with preferred embodiments of the invention, it will be evident for a person skilled in the art that several modifications are conceivable without departing from the invention as defined by the following claims.

The invention claimed is:

1. A wind turbine comprising a nacelle, the nacelle having a substantially longitudinal extension, a height extension and a width extension, comprising a front end, a rear end, a bottom part, a top part and side parts, and being adapted to house a number of wind turbine components, which wind turbine components are supported by an internal support structure, the support structure comprising:
   a main foundation positioned at the front end of the nacelle and comprising a first foundation connection area positioned adjacent the bottom part of the nacelle and a second foundation connection area also positioned adjacent the bottom part of the nacelle and spaced from the first foundation connection, and
   a rear frame connected to the main foundation and comprising a first longitudinal frame element connected to the first connection area and extending from the main foundation towards the rear end of the nacelle and a second longitudinal frame element connected to the second connection area and extending from the main foundation towards the rear end of the nacelle,
   wherein each of the first and second foundation connection areas comprises at least a first face and a second face, the second face being displaced in a longitudinal direction, a height direction and/or a width direction of the nacelle in relation to a position of the first face on the main foundation, and
   wherein each of the first and second longitudinal frame elements being connected to the main foundation via connections at least via the first face and the second face of the respective foundation connection area.

2. The wind turbine according to claim 1, wherein the second face of each of the first and second connection areas is displaced in a first direction towards the side parts of the nacelle and in a second direction towards the front end of the nacelle in relation to the position of the first face of the respective connection area on the main foundation.

3. The wind turbine according to claim 2, wherein each of the first and second foundation connection areas comprises one or more additional face(s), the one or more additional face(s) being displaced in a longitudinal direction, a height direction or a width direction of the nacelle and/or having a substantially perpendicular extension in relation to a position and extension of the first face of the respective connection area on the main foundation.

4. The wind turbine according to claim 1, wherein the connection is a bolt connection, a rivet connection, a spot welding connection or a combination thereof.

5. The wind turbine according to claim 1, wherein the first and second longitudinal frame elements are connected along their extensions via at least one cross beam.

6. The wind turbine according to claim 1, wherein each of the first and second longitudinal frame elements comprises a first U- or C-profile arranged inside a second U- or C-profile.

7. The wind turbine according to claim 6, wherein the first U- or C-profile and the second U- or C-profile are connected via bolt connections.

8. The wind turbine according to claim 6, wherein the first U- or C-profile extends beyond an end of the second U- or C-profile, the second U- or C-profile comprising a first frame face at its end and the first U- or C-profile comprising a second frame face in the area extending beyond the second U- or C-profile.

9. The wind turbine according to claim 6, wherein at least the first U- or C-profile comprises a plurality of sub-U- or C-profiles, said sub-U- or C-profiles being independent of each other and connectable to the second U- or C-profile via bolt connections.

10. The wind turbine according to claim 6, wherein the first U- or C-profile comprises one or more holes providing access to the second U- or C-profile.

11. The wind turbine according to claim 6, wherein the main foundation and the rear frame are connected via a plurality of bolt groups, the bolt groups being positioned in a way that enables control of a torque between the main foundation and the rear frame.

12. The wind turbine according to claim 11, wherein the connection between the main foundation and the rear frame has a torque centre where the plurality of bolt groups are positioned at a distance from the torque centre to reduce the forces to be obtained by each bolt group.

13. A method for connecting a rear frame to a main foundation in a nacelle for a wind turbine, the method comprising:
   providing a main foundation having a first foundation connection area and a second foundation connection area spaced from the first foundation connection area, wherein each of the first and second foundation connection areas comprises at least a first face and a second face, the second face being displaced in a longitudinal direction, a height direction and/or a width direction of the nacelle in relation to a position of the first face on the main foundation, and a rear frame having a first longitudinal frame element and a second longitudinal frame element,
   connecting each of the first and second longitudinal frame elements to the first and second connection areas, respectively, the connecting step comprising:
      aligning a first frame face of the longitudinal frame element with a first face of the connection area on the main foundation,
      connecting the first frame face with the first face by means of bolts,
      aligning a second frame face of the longitudinal frame element with a second face of the connection area on the main foundation, and
      connecting the second frame face with the second face by means of bolts.

* * * * *